United States Patent
Lei et al.

(10) Patent No.: US 8,140,499 B2
(45) Date of Patent: Mar. 20, 2012

(54) CONTEXT BASED CACHE INFRASTRUCTURE TO ENABLE SUBSET QUERY OVER A CACHED OBJECT

(75) Inventors: Yang Lei, Cary, NC (US); Hasan Muhammad, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 1628 days.

(21) Appl. No.: 11/101,667

(22) Filed: Apr. 8, 2005

(65) Prior Publication Data
US 2006/0230024 A1    Oct. 12, 2006

(51) Int. Cl.
*G06F 7/00* (2006.01)
*G06F 17/30* (2006.01)

(52) U.S. Cl. .......... 707/705; 707/797; 707/798
(58) Field of Classification Search .......... 707/3–5, 707/7, 10, 101; 706/47
See application file for complete search history.

(56) References Cited

U.S. PATENT DOCUMENTS

| | | | | |
|---|---|---|---|---|
| 5,842,219 A * | 11/1998 | High et al. | | 707/103 R |
| 5,864,819 A * | 1/1999 | De Armas et al. | | 704/275 |
| 5,890,151 A | 3/1999 | Agrawal et al. | | 707/5 |
| 6,145,056 A * | 11/2000 | Heydon et al. | | 711/129 |
| 6,208,993 B1 * | 3/2001 | Shadmon | | 1/1 |
| 6,421,683 B1 | 7/2002 | Lamburt | | 707/104 |
| 6,535,970 B1 * | 3/2003 | Bills et al. | | 711/207 |
| 6,704,736 B1 * | 3/2004 | Rys et al. | | 1/1 |
| 6,735,593 B1 | 5/2004 | Williams | | 707/102 |
| 6,748,374 B1 * | 6/2004 | Madan et al. | | 707/3 |
| 6,799,184 B2 * | 9/2004 | Bhatt et al. | | 707/102 |
| 6,868,525 B1 * | 3/2005 | Szabo | | 715/738 |
| 6,928,466 B1 * | 8/2005 | Bulka et al. | | 709/213 |
| 6,934,699 B1 * | 8/2005 | Haas et al. | | 1/1 |
| 6,950,815 B2 * | 9/2005 | Tijare et al. | | 707/1 |
| 7,020,644 B2 * | 3/2006 | Jameson | | 706/47 |
| 7,047,242 B1 * | 5/2006 | Ponte | | 707/10 |
| 7,130,839 B2 * | 10/2006 | Boreham et al. | | 707/3 |
| 7,181,438 B1 * | 2/2007 | Szabo | | 707/3 |
| 7,219,091 B1 * | 5/2007 | Bruno et al. | | 1/1 |
| 7,467,131 B1 * | 12/2008 | Gharachorloo et al. | | 1/1 |
| 2003/0018898 A1 * | 1/2003 | Lection et al. | | 713/182 |
| 2003/0065874 A1 * | 4/2003 | Marron et al. | | 711/100 |

(Continued)

OTHER PUBLICATIONS

Mahalingam et al., An Ontology Tool for Query Formulation in an Agent-Based Context, Jun. 24-27, 1997, IEEE, pp. 170-178.*

*Primary Examiner* — Kuen Lu
*Assistant Examiner* — Jessica N Le
(74) *Attorney, Agent, or Firm* — Cuenot, Forsythe & Kim, LLC

(57) ABSTRACT

A method, an apparatus, and computer instructions are provided for a context based cache infrastructure to enable subset query over a cached object. Responsive to detecting a query to a root context of a context tree, the tree is traversed for a parent context of a subcontext corresponding to the name and value pair, which is identified by a user in the query. If the parent context caches all query results, the query results are iterated and the remaining name and value pairs are filtered out. However, if the parent context does not cache all query results, the traversing step is repeated for next parent context of the subcontext until a root context is encountered. If a root context is encountered, a query is issued to the database for the name and value pair and the result of the database query is cached in a new context.

20 Claims, 4 Drawing Sheets

U.S. PATENT DOCUMENTS

| | | | |
|---|---|---|---|
| 2003/0195870 A1* | 10/2003 | Newcombe et al. | 707/3 |
| 2003/0212664 A1* | 11/2003 | Breining et al. | 707/3 |
| 2004/0059719 A1* | 3/2004 | Gupta et al. | 707/3 |
| 2004/0128615 A1* | 7/2004 | Carmel et al. | 715/513 |
| 2004/0168169 A1* | 8/2004 | Ebro et al. | 717/172 |
| 2004/0230584 A1* | 11/2004 | Nouri | 707/100 |
| 2006/0112090 A1* | 5/2006 | Amer-Yahia et al. | 707/4 |
| 2006/0190355 A1* | 8/2006 | Jammes et al. | 705/27 |
| 2006/0224610 A1* | 10/2006 | Wakeam et al. | 707/101 |

\* cited by examiner

FIG. 4
*400*
- /
  *402*
  - /product/books
    *404*
    - /product/books/type/bestsellers
FIG. 5
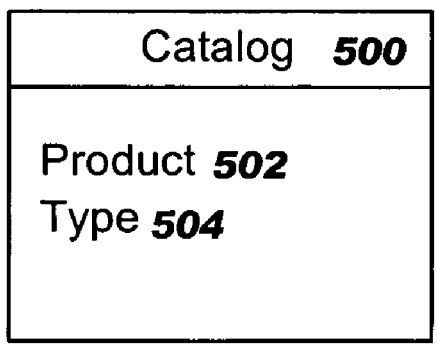
| Catalog 500 |
|---|
| Product 502 |
| Type 504 |
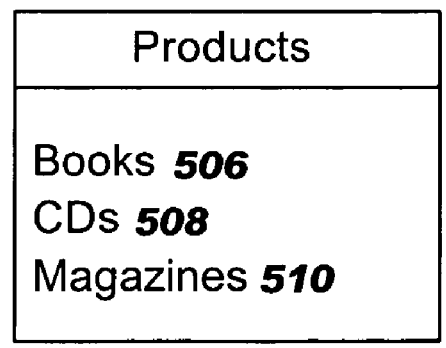
| Products |
|---|
| Books 506 |
| CDs 508 |
| Magazines 510 |
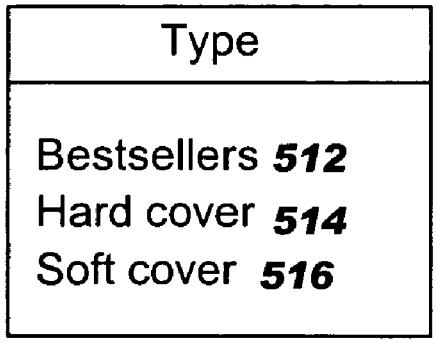
| Type |
|---|
| Bestsellers 512 |
| Hard cover 514 |
| Soft cover 516 |
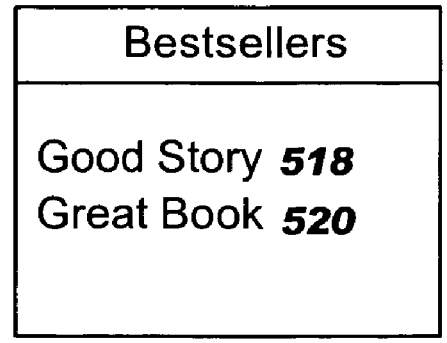
| Bestsellers |
|---|
| Good Story 518 |
| Great Book 520 |

CONTEXT BASED CACHE INFRASTRUCTURE TO ENABLE SUBSET QUERY OVER A CACHED OBJECT

BACKGROUND OF THE INVENTION

1. Technical Field

The present invention relates to an improved data processing system. In particular, the present invention relates to cached object returned from a database query. Still more particular, the present invention relates to a context based cached infrastructure that enables a subset query over the cached object returned from a database query in a data processing system.

2. Description of Related Art

In the current enterprise JavaBeans™ (EJB) specification, lifecycle methods are provided for managing an entity bean's lifecycle. Examples of lifecycle methods include ejbCreate, which manages the creation of entity beans; ejbStore, which manages update of entity beans; and ejbRemove, which manages removal of entity beans. An entity bean is an enterprise JavaBean™ that has a physical data representation in a data store, for example, a row in a relational database table. Enterprise JavaBean™ or J2EE is a product available from Sun Microsystems, Inc.

In addition to lifecycle methods, enterprise JavaBeans™ specification provides ejbFind and ejbSelect methods to query entity beans that satisfy a search condition. For applications that seldom update their data, it is more efficient to cache the data locally rather than querying the database each time an update occurs, since database queries affect application performance.

Currently, query results may be cached and a user may search the query results by a certain criteria. For example, a catalog may have a "product" field and a "type" field, a user may search by the product, such as product="electronics" or product="books". Since the catalog is seldom updated, the query results may be cached by the criteria, such that when the user performs the same search, the result is returned from the cached object instead of the database, thus, improving the search response time. If query results are cached without context, for each query, data may be returned if and only if it is an exact match.

Currently, no existing mechanism is present that allows a search to be performed on the subset of the existing cached query results. For example, to perform a search on query results returned by product="books" for type="bestsellers". If all the "books" are already cached, it is more efficient to iterate the result of "books" and filter them to retrieve the "bestsellers", rather than performing a separate search on the database based on the product and type.

In addition, no existing mechanism is available that sets up query results in such a way that makes it easy for user to iterate and filter query results. Therefore, it would be advantageous to have an improved method for a context based cache infrastructure that enables subset query over a cached object, such that database queries may be minimized to improve search performance.

BRIEF SUMMARY OF THE INVENTION

The present invention provides a method, an apparatus, and computer instructions for a context based infrastructure to enable subset query over a cached object. The mechanism of the present invention detects a query to a root context of a context tree from a user, wherein the query includes a name and value pair. Responsive to detecting the query, the mechanism traverses the context tree for a parent context of a subcontext corresponding to the name and value pair, and determines if the parent context caches all query results.

If the parent context does not cache all query results, the mechanism repeats the traversing step for next parent context of the subcontext until a root context is encountered. When a root context is encountered, the mechanism issues a query to the database for the name and value pair, and caches the result of the database query in a new context.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a diagram illustrating an exemplary context tree cached by the mechanism of the present invention for a query result in accordance with an illustrative embodiment of the present invention;

FIG. 5 is a diagram illustrating data structures representing root context 400, subcontexts 402, and 404 in FIG. 4 in accordance with an illustrative embodiment of the present invention.

DETAILED DESCRIPTION OF THE INVENTION

Figure 1:
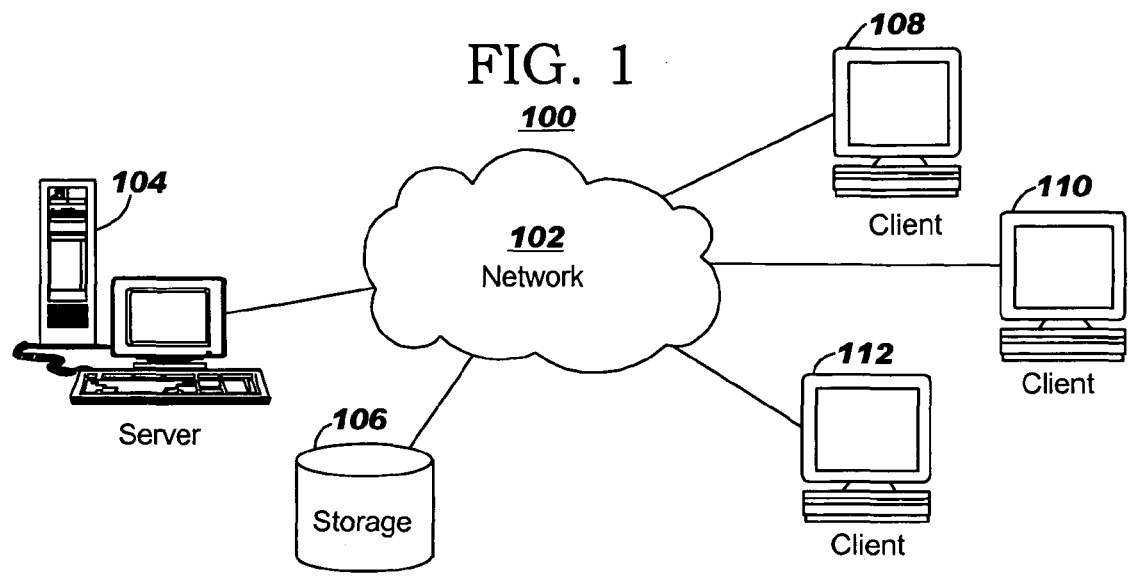
FIG. 1 is a pictorial representation of a network of data processing systems in which the present invention may be implemented in accordance with a preferred embodiment of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
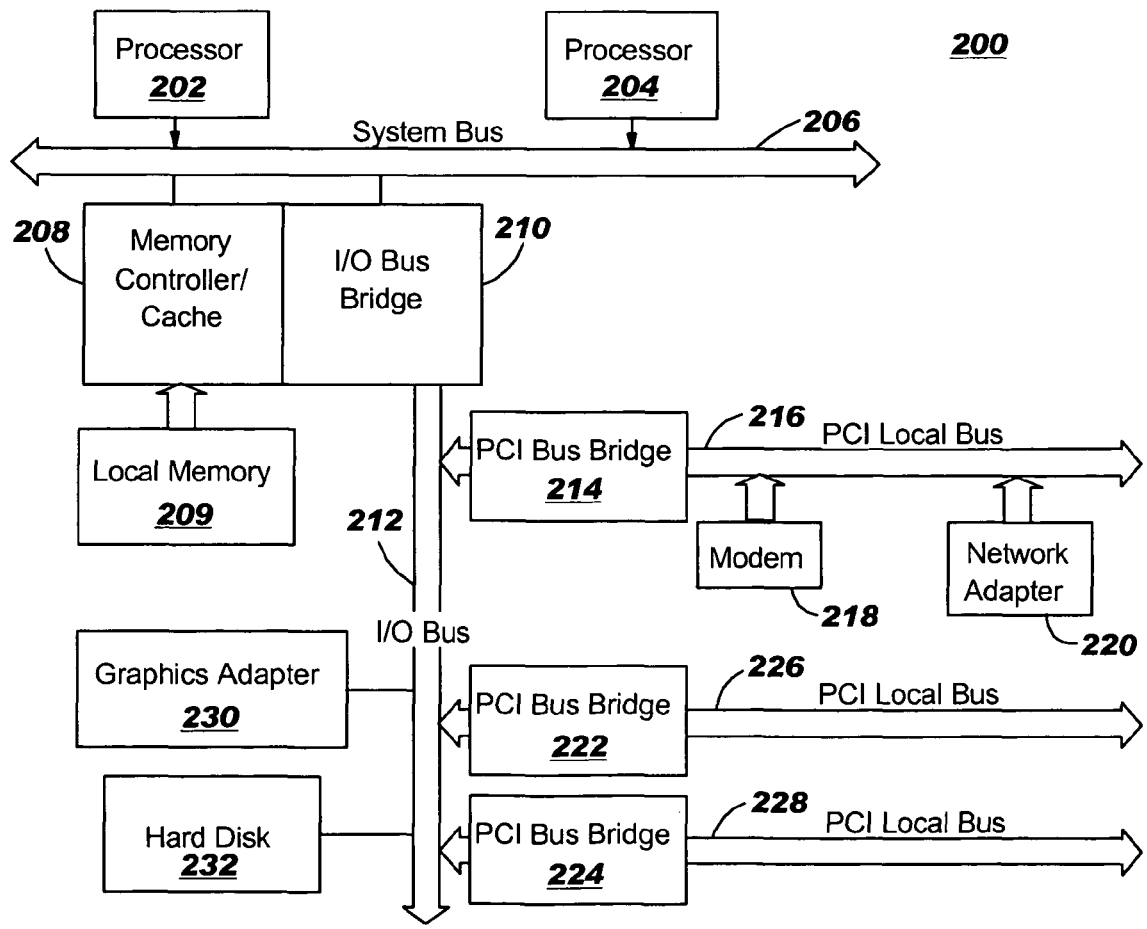
FIG. 2 is a block diagram of a data processing system that may be implemented as a server in which the present invention may be implemented in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/o bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
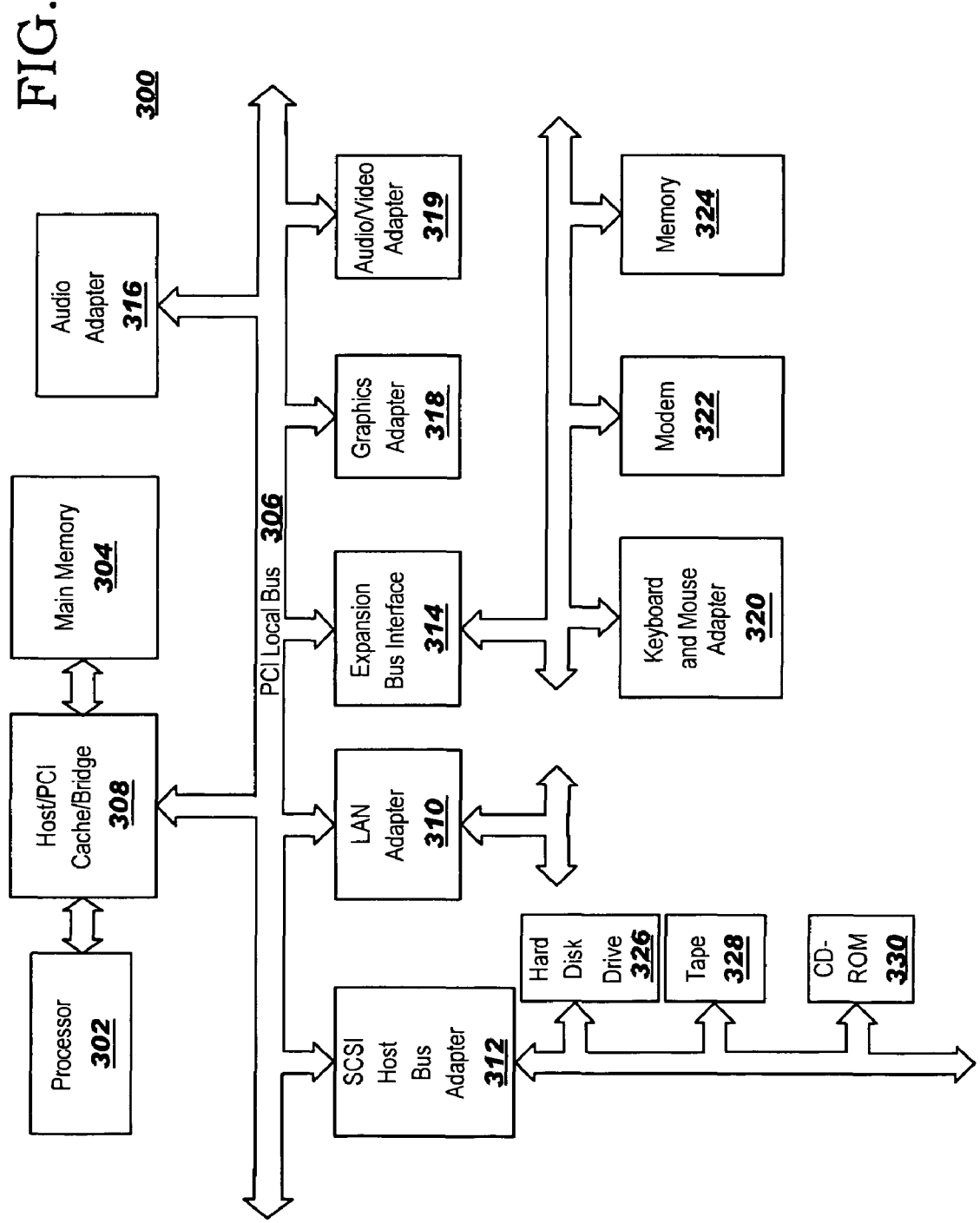
FIG. 3 is a block diagram illustrating a data processing system in which the present invention may be implemented in accordance with a preferred embodiment of the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The processes and mechanisms of the present invention may be implemented as computer instructions executed by processor 302 in data processing system 300 in FIG. 3, or processors 202 and 204 in data processing system 200 in FIG. 2.

The present invention provides a method, an apparatus, and computer instructions for a context based cache infrastructure to enable subset query over cached object. The present invention provides a mechanism that enables in-memory or cached object query by constructing the cache as a context tree. The context tree includes a root cache context, '/', for each EJB type. The root cache context can hold objects that belong to the EJB type without any filtering. For example, a root cache context may hold the entire catalog data returned from catalog.findAll() query.

Each root cache context may include sub contexts, which indicate detailed filtering of cached results of the current root cache context by a group of field name/field value pairs. For example, an EJB type "catalog" may include a "product" field and a "type" field, and a root cache context '/' may include sub context '/product/books', which hold objects returned from catalog.findbyProduct("book") query. Sub context '/product/ books' may also include its sub context '/product/books/ types/bestsellers', which hold objects returned from catalog- .findByProductAndType("books", "bestsellers") query.

When a query is detected by the mechanism of the present invention, a findContext() method is called to the root cache context with a field name and field pair pairs, for example, {"product", "book"} {"type", "bestsellers"}. In turn, a context at the level of '/product/book/type/bestsellers' is returned. The mechanism of the present invention then traverses the parents of '/product/book/type/bestsellers' context until it reaches the root cache context to identify the nearest context that cached the query results.

In the above example, the mechanism of the present invention traverses first in subcontext '/product/book', and then in root cache context '/'. If a parent context that cached query results is found, the mechanism of the present invention iterates the cached results of the upper level and filters out the remaining field name and field value pairs, that is, the original field name and value pairs excluding the upper level context represented. However, if no parent context is found, the mechanism of the present invention issues a query to the database and caches the result at the new context level.

Turning now to FIG. 4, a diagram illustrating an exemplary context tree cached by the mechanism of the present invention for a query result is depicted in accordance with an illustrative embodiment of the present invention. As shown in FIG. 4, for each EJB type, the mechanism of the present invention creates a root cache context. In this example, root context '/' 400 includes all catalog data returned from a Catalog.findAll() query.

Root cache context 400 has subcontext that indicates detail filtering of cache result by a group of field name/field value pair. In this example, root cache context 400 has subcontext '/product/books' 402, which hold objects filtered from a Catalog.findByProduct("book") subset query. In turn, subcontext '/product/books' 402 has a subcontext '/product/books/type/ bestsellers' 404 that hold objects filtered from a Catalog.find- ByProductAndType("books","bestseller") subset query.

Turning now to FIG. 5, a diagram illustrating data structures representing root context 400, subcontexts 402, and 404 in FIG. 4 is depicted in accordance with an illustrative embodiment of the present invention. As shown in FIG. 5, catalog 500 includes two fields, product 502 and type 504. Catalog 500 represents root cache context 400 in FIG. 4.

Product field 502 has a set of fields, including books 506, CDs 508, and magazines 510. Books 506 represents subcontext '/product/books' 402 in FIG. 4. In addition, type fields 504 has a set of fields, including bestsellers 512, hard cover 514, and soft cover 516. Bestsellers 512 represent '/product/ books/type/bestsellers' 404 in FIG. 4. Bestsellers 512 include a number of entries, including Good Story 518 and Great Book 520. These are entries that are returned when subset query Catalog.findByProductAndType("books","bestsellers") is filtered.

Figure 6:
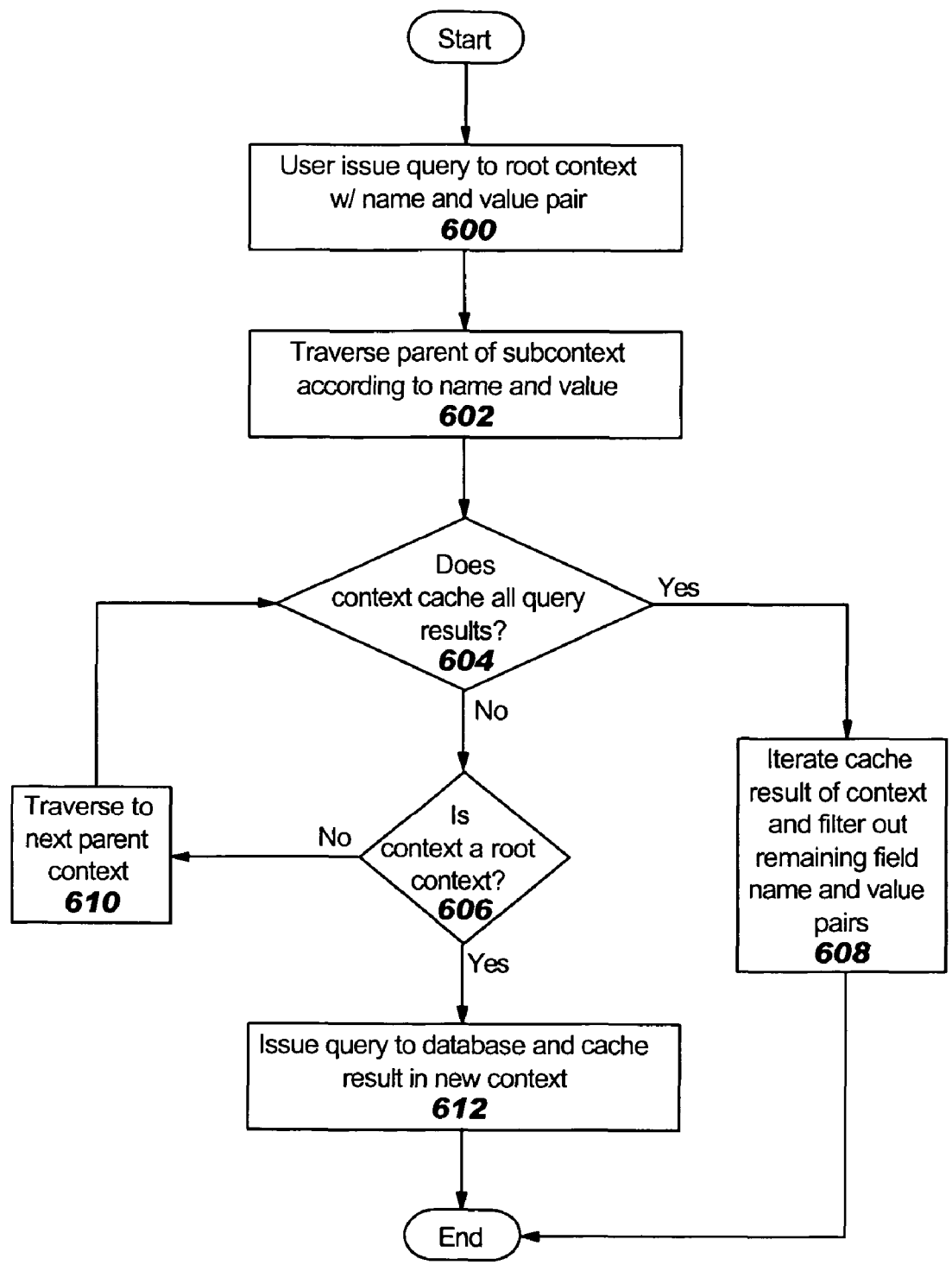
FIG. 6 is a flowchart of an exemplary process for context based cache infrastructure to enable subset query over a cached object in accordance with an illustrative embodiment of the present invention.

Turning now to FIG. 6, a flowchart of an exemplary process for context based cache infrastructure to enable subset query over a cached object is depicted in accordance with an illustrative embodiment of the present invention. As shown in FIG. 6, the process begins when a user issues a query to the root cache context of the context tree with the field name and value pair (step 600). An example of the field name and field value pair may be {"product", "book"} {"type", "bestsellers"}.

Next, the mechanism of the present invention traverses the parent of the subcontext according to the field name and value pair (step 602). A determination is then by the mechanism as to whether the parent context caches all query results (step 604). If the parent context has all query results, the mechanism of the present invention iterates the cache result of the parent context and filters out the remaining field name and value pairs (step 608). The process then terminates.

However, if the parent context does not have all query results, the mechanism of the present invention then makes a determination as to whether the parent context is the root context (step 606). This means that the root context has been reached. If the parent context is not the root context, the mechanism traverses to the next parent context up the context tree (step 610). However, if the parent context is the root context, the mechanism of the present invention issues a query to the database and caches the query result in a new context (step 612) and the process terminates thereafter.

In summary, the present invention provides a context based infrastructure to enable subset query over a cached object. By using the mechanism of the present invention, a user may now iterate and filter query results. In addition, database queries may now be minimized to improve search performance.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing hardware system having a processor, comprising:
   receiving, from a user, a query to a root context of a context tree, the query including a name and value pair;
   traversing, upon detecting the query to the root context of the context tree, the context tree for a parent context of a subcontext corresponding to the name and value pair; and
   determining, by the processor, whether the parent context caches all query results.

2. The method of claim 1, further comprising:
repeating, upon the parent context not caching all query results, the traversing for one or more next parent contexts of the subcontext until a root context is encountered;
issuing, responsive to encountering the root context, the query to a database for the name and value pair; and
caching a result of the query to the database in a new context.

3. The method of claim 1, further comprising:
iterating, upon the parent context caching all query results, each query result, and filtering out remaining name and value pairs.

4. The method of claim 1, wherein the root context includes a set of objects corresponding to a bean type.

5. The method of claim 4, wherein the subcontext includes a subset of objects filtered based on the name and value pair.

6. The method of claim 1, wherein the context tree includes a root context and a set of subcontexts, and each of the set of subcontext includes one or more subcontexts.

7. The method of claim 1, wherein the context tree includes a root cache context for each bean type.

8. A data processing hardware system, comprising:
a processor, wherein the processor is configured to perform:
receiving, from a user, a query to a root context of a context tree, the query including a name and value pair;
traversing, upon detecting the query to the root context of the context tree, the context tree for a parent context of a subcontext corresponding to the name and value pair; and
determining whether the parent context caches all query results.

9. The data processing hardware system of claim 1, wherein the processor is further configured to perform:
repeating, upon the parent context not caching all query results, the traversing for one or more next parent contexts of the subcontext until a root context is encountered;
issuing, responsive to encountering the root context, the query to a database for the name and value pair; and
caching a result of the query to the database in a new context.

10. The data processing hardware system of claim 8, wherein the processor is further configured to perform:
iterating, upon the parent context caching all query results, each query result, and filtering out remaining name and value pairs.

11. The data processing hardware system of claim 8, wherein the root context includes a set of objects corresponding to a bean type.

12. The data processing hardware system of claim 11, wherein the subcontext includes a subset of objects filtered based on the name and value pair.

13. The data processing hardware system of claim 8, wherein the context tree includes a root context and a set of subcontexts, and each of the set of subcontext includes one or more subcontexts.

14. The data processing hardware system of claim 8, wherein the context tree includes a root cache context for each bean type.

15. A computer program product comprising a computer usable storage medium having stored therein computer usable program code, the computer usable program code, which when executed on a data processing hardware system, causes the data processing hardware system to perform:
receiving, from a user, a query to a root context of a context tree, the query including a name and value pair;
traversing, upon detecting the query to the root context of the context tree, the context tree for a parent context of a subcontext corresponding to the name and value pair; and
determining whether the parent context caches all query results.

16. The computer program product of claim 15, wherein the computer usable program code further causes the data processing hardware system to perform:
repeating, upon the parent context not caching all query results, the traversing for one or more next parent contexts of the subcontext until a root context is encountered;
issuing, responsive to encountering the root context, the query to a database for the name and value pair; and
caching a result of the query to the database in a new context.

17. The computer program product of claim 15, wherein the computer usable program code further causes the data processing hardware system to perform:
iterating, upon the parent context caching all query results, each query result, and filtering out remaining name and value pairs.

18. The computer program product of claim 15, wherein the root context includes a set of objects corresponding to a bean type.

19. The computer program product of claim 18, wherein the subcontext includes a subset of objects filtered based on the name and value pair.

20. The computer program product of claim 15, wherein the context tree includes a root context and a set of subcontexts, and each of the set of subcontext includes one or more subcontexts.

* * * * *